United States Patent
Sun (10) Patent No.: US 7,884,917 B2
(45) Date of Patent: Feb. 8, 2011

(54) SPACER AND LIQUID CRYSTAL DISPLAY PANEL WITH THE SAME

(75) Inventor: Ning Sun, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 152 days.

(21) Appl. No.: 12/265,786

(22) Filed: Nov. 6, 2008

(65) Prior Publication Data
US 2009/0190084 A1    Jul. 30, 2009

(30) Foreign Application Priority Data
Jan. 25, 2008    (CN) .................. 2008 1 0056893

(51) Int. Cl.
*G02F 1/1339* (2006.01)

(52) U.S. Cl. ..................... 349/157; 349/155

(58) Field of Classification Search ............... 349/156, 349/56, 58, 104, 106, 107, 108, 155, 157
See application file for complete search history.

(56) References Cited

U.S. PATENT DOCUMENTS

| | | | |
|---|---|---|---|
| 6,678,030 B2 * | 1/2004 | Imabayashi et al. | 349/155 |
| 6,870,593 B2 * | 3/2005 | Satoh | 349/155 |
| 2003/0048403 A1 * | 3/2003 | Satoh | 349/156 |
| 2003/0071553 A1 * | 4/2003 | Ryu et al. | 313/292 |
| 2006/0290857 A1 * | 12/2006 | Yang et al. | 349/129 |
| 2008/0123030 A1 | 5/2008 | Song | 349/110 |
| 2009/0190084 A1 * | 7/2009 | Sun | 349/157 |

FOREIGN PATENT DOCUMENTS

| | | |
|---|---|---|
| CN | 1963606 A | 5/2007 |
| JP | 11-218768 A | 8/1999 |

* cited by examiner

*Primary Examiner*—Brian M Healy
(74) *Attorney, Agent, or Firm*—Ladas & Parry LLP (57) ABSTRACT

The present invention relates to a spacer and a liquid crystal display (LCD) panel with the same. The LCD panel comprises a color filter substrate, a thin film transistor (TFT) array substrate and a liquid crystal layer disposed between the color filter substrate and the thin film transistor array substrate. At least one spacer is disposed between the color filter substrate and the thin film transistor array substrate. Each spacer can comprise a first sub-spacer and a second sub-spacer. Elasticity of the first sub-spacer is smaller than elasticity of the second sub-spacer, and height of the first sub-spacer is smaller than height of the second sub-spacer.

16 Claims, 7 Drawing Sheets

SPACER AND LIQUID CRYSTAL DISPLAY PANEL WITH THE SAME

FIELD OF THE INVENTION

The present invention relates to a spacer and a liquid crystal display panel with the same.

BACKGROUND OF THE INVENTION

Liquid crystal display (LCD) technology has been developed aggressively over recent decades and has obtained significant progress in both screen size and display quality. Currently, one drop filling (ODF) process is one of the common processes in manufacturing a liquid crystal display panel for filling liquid crystal and can save the time for filling liquid crystal in the panel and improve yield. One of the bottlenecks of the conventional ODF process is insufficient margin for the amount of the filled liquid crystal in operation. When the amount of the filled liquid crystal in the ODF process is not accurate, or when heights of the spacers between a color filter substrate and a thin film transistor (TFT) array substrate are not uniform, void bubbles or gravity defects tend to occur in the liquid crystal layer. Void bubbles refer to the bubbles generated inside a LCD panel during a low temperature test due to shrinkage of the liquid crystal. At a low temperature, both the spacers and the liquid crystal are subjected to certain shrinkage. When the amount of shrinkage of the spacers is smaller than that of the liquid crystal, bubbles may be generated in the liquid crystal panel. Gravity defect refers to an excessive cell gap in the panel due to settlement of the liquid crystal at the bottom of the panel under the gravity when the panel is in an upright state. When the liquid crystal is expanded at a high temperature, gravity defects deteriorate.

Typically, for the spacers disposed between the color filter substrate and the TFT array substrate in a liquid crystal panel, on one hand, the smaller the distribution density of the spacers is, that is, the smaller the number of the spacers per unit area is, the more unlikely the void bubbles occur in low temperature; however, in that case, the pressure resistance of the panel is reduced and it tends to suffer from gravity defect. On the other hand, the larger the distribution density of the spacers is, the more likely the void bubbles occur; however, the pressure resistance of the panel is enhanced and it is unlikely for gravity defect to occur. Typically, the larger elasticity of the spacers is, and the larger the margin of the amount of the filled liquid crystal in the ODF process is, so that the possibility of void bubbles and gravity defects is low, but pressure resistance of the LCD panel tends to decrease. Therefore, it is critical to select an appropriate material as well as a desired distribution density for the spacers between the color filter substrate and the thin film transistor substrate in order to improve the margin of amount of the filled liquid crystal in the ODF process and the pressure resistance.

In a conventional large size LCD panel, it is typical to use column spacers made of a photoresist resin attached to the color filter substrate so as to maintain the cell gap of the LCD panel. Thus, it is necessary for the column spacers to comprise an appropriate material and a desired distribution density so as to increase margin of the amount of the filled liquid crystal in the ODF process and enhance pressure resistance of the LCD panel. It is more preferable that the margin of the amount of the filled liquid crystal in the ODF process can be improved while the pressure resistance of the LCD panel can be maintained.

SUMMARY OF THE INVENTION

According to one embodiment of the present invention, there is provided a liquid crystal display (LCD) panel. The LCD panel comprises a color filter substrate, a thin film transistor (TFT) array substrate and a liquid crystal layer disposed between the color filter substrate and the thin film transistor array substrate. At least one spacer is disposed between the color filter substrate and the thin film transistor array substrate. Each spacer may comprise a first sub-spacer and a second sub-spacer. Elasticity of the first sub-spacer is smaller than elasticity of the second sub-spacer, and height of the first sub-spacer is smaller than height of the second sub-spacer.

In one embodiment, the second sub-spacer is located outside of the first sub-spacer. The first sub-spacer can contact directly with the second sub-spacer. Alternatively, a gap can be disposed between the first sub-spacer and the second sub-spacer. For example, the gap between the first sub-spacer and the second sub-spacer is in a range of 0 to 15 μm. The second sub-spacer can have a shape selected from a group consisting of a hollow cylinder, a hollow prism and a hollow frustum, and the first sub-spacer can have a shape selected from a group consisting of a cylinder, a prism and a frustum.

In another embodiment, the second sub-spacer is located inside of the first sub-spacer and a gap is disposed between the first sub-spacer and the second sub-spacer. In one example, the gap between the first sub-spacer and the second sub-spacer is in a range of 0 to 15 μm. The second sub-spacer can have a shape selected from a group consisting of a cylinder, a prism and a frustum, and the first sub-spacer can have a shape selected from a group consisting of a hollow cylinder, a hollow prism and a hollow frustum.

In one embodiment, the first sub-spacer can comprise a material selected from a group consisting of silicon oxide, silicon nitride and silicon oxynitride, and the second sub-spacer can comprise a photoresist resin.

In one example, the height of the second sub-spacer is in a range of 1-10 μm, and the height difference between the first sub-spacer and the second sub-spacer is no more than 5 μm.

According to one embodiment of the present invention, there is provided a spacer for a liquid crystal display panel. The spacer can comprise at least two sub-spacers, wherein each sub-spacer is different in height. The sub-spacer with larger height has a larger elasticity.

The spacer in the LCD panel according to the embodiments of the present invention has a composite structure comprising members with different elasticity, thus improving the margin of amount of the filled liquid crystal in an ODF process and the pressure resistance of the LCD panel. The distribution density of the spacers in the LCD panel according to the embodiments of the present invention is not increased so that the margin of amount of the filled liquid crystal in an ODF process and the pressure resistance of the LCD panel can be further improved. Thus yield and product stability can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

The present invention will be described thereafter in further details with reference to the accompanying drawings and embodiments.

First Embodiment

Figure 1A:
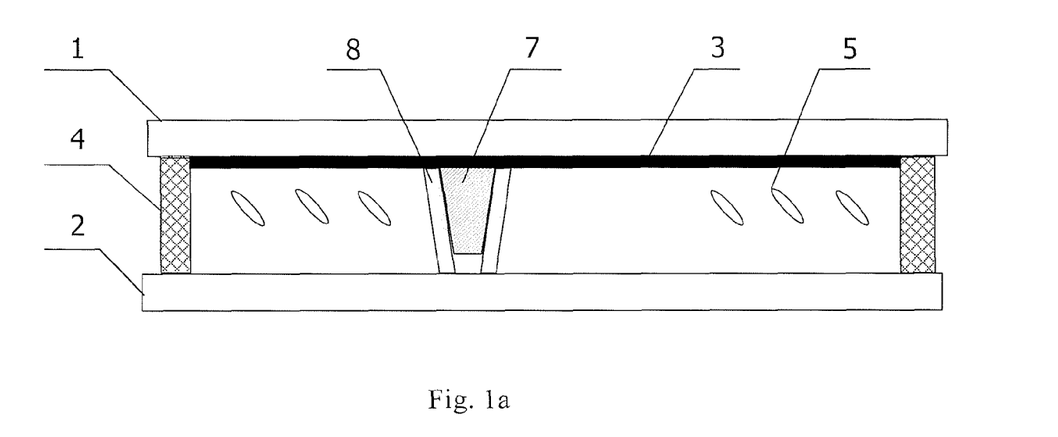
FIG. 1a is a schematic sectional view of a LCD panel according to a first embodiment of the present invention.
Figure 1B:
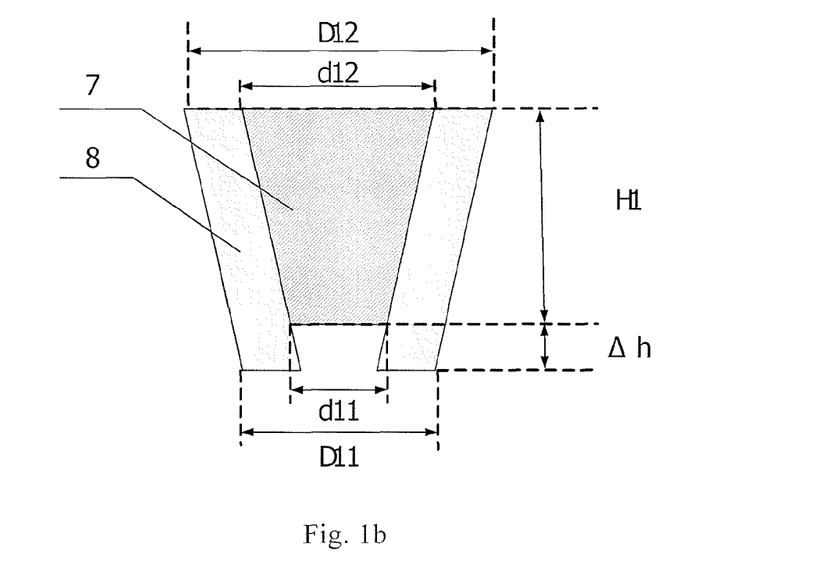
FIG. 1b is a schematic sectional view of a spacer in the LCD panel according to the first embodiment of the present invention.
Figure 1C:
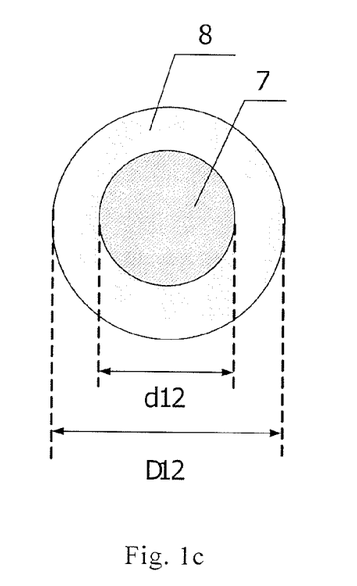
FIG. 1c is a schematic cross-sectional view of a spacer in the LCD panel according to the first embodiment of the present invention.

FIG. 1a is schematic sectional view of a liquid crystal display LCD panel according to the first embodiment of the present invention. As shown in FIG. 1a, the LCD panel according to the first embodiment comprises a color filter substrate 1, a thin film transistor (TFT) array substrate 2, and a liquid crystal layer 5. At least one composite spacer is disposed between the color filter substrate 1 and the TFT array substrate 2. Each spacer can comprise an inner first sub-spacer 7 and an outer first sub-spacer 8. Elasticity of the first sub-spacer 7 is smaller than elasticity of the second sub-spacer 8. The liquid crystal layer 5 is filled in space defined by the color filter substrate 1, the thin film transistor array substrate 2 and a sealant 4. The composite spacer is located on a black matrix 3 on the color filter substrate 1. FIG. 1b is a schematic sectional view of the spacer in the LCD panel according to the first embodiment of the present invention, and FIG. 1c is a schematic cross-sectional view of the spacer in the LCD panel according to the first embodiment of the present invention. As shown in FIGS. 1b and 1c, the first sub-spacer 7 can be formed in a shape of a truncated cone with a diameter d11 of a top face, a diameter d12 of a bottom face and a height of H1. Preferably, d11 is in a range of 5-6 µm, d12 is in a range of 10-12 µm, and H1 is in a range of 3-5 µm. The second sub-spacer 8 can be formed in a shape of a hollow truncated cone with an outer diameter D11 of a top face, an outer diameter D12 of a bottom face and a height of H1+Δh. Preferably, D11 is in a range of 10-12 µm, D12 is in a range of 20-25 µm, and Δh is in a range of 0.5-3 µm. The manufacturing method of the LCD panel according to the first embodiment of the present invention is described as following.

The black matrix 3 and color filter layers of red, green and blue are formed on a glass substrate to prepare the color filter substrate. Then the composite spacer is formed on the black matrix 3. In particular, a material with a smaller elasticity and a higher stiffness such as silicon oxide, silicon nitride and silicon oxynitride is deposited, followed by processes such as applying a photoresist, exposing with a mask, developing, etching, and lifting off, etc., so that the first sub-spacer 7 is fabricated. Then a material with a larger elasticity such as a photoresist resin is deposited at the periphery of the first-spacer 7, followed by exposing with a mask, developing, etching processes and so on, so that the the second sub-spacer 8 is fabricated. Thus, a composite spacer with an inner rigid core and an outer elastic shell can be obtained. Finally, the color filter substrate 1 and the TFT array substrate 2 are subjected to an ODF process and assembled by the sealant 4 to obtain the LCD panel, as shown in FIG. 1a.

Second Embodiment

Figure 2A:
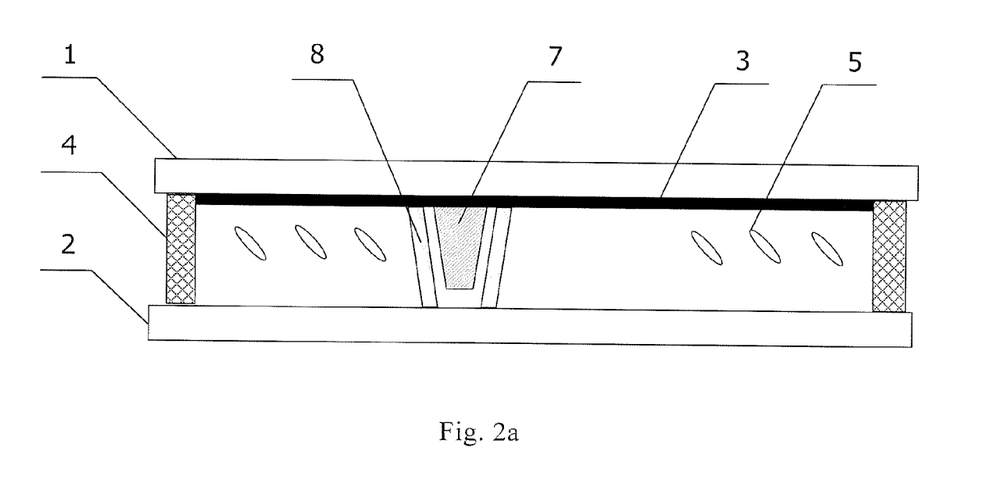
FIG. 2a is a schematic sectional view of a LCD panel according to a second embodiment of the present invention.
Figure 2B:
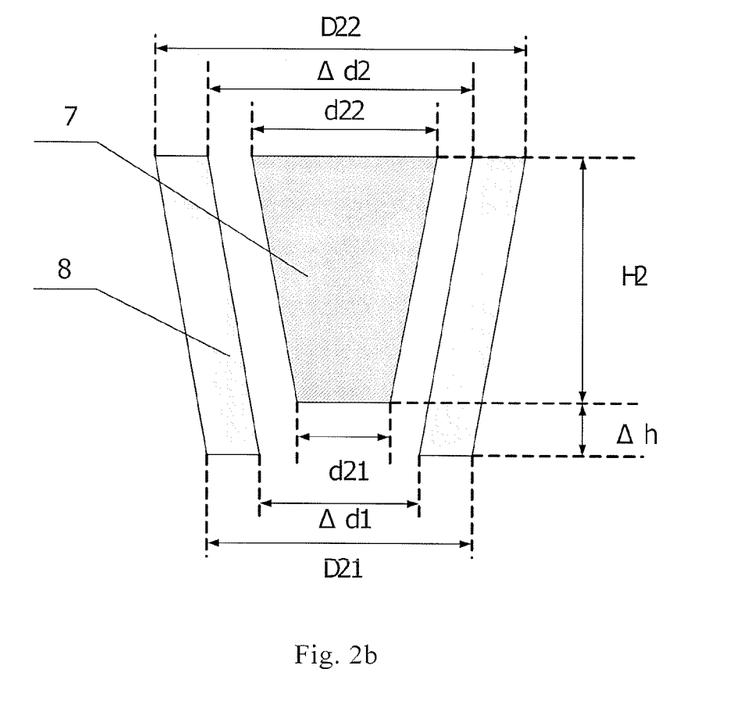
FIG. 2b is a schematic sectional view of a spacer in the LCD panel according to the second embodiment of the present invention.
Figure 2C:
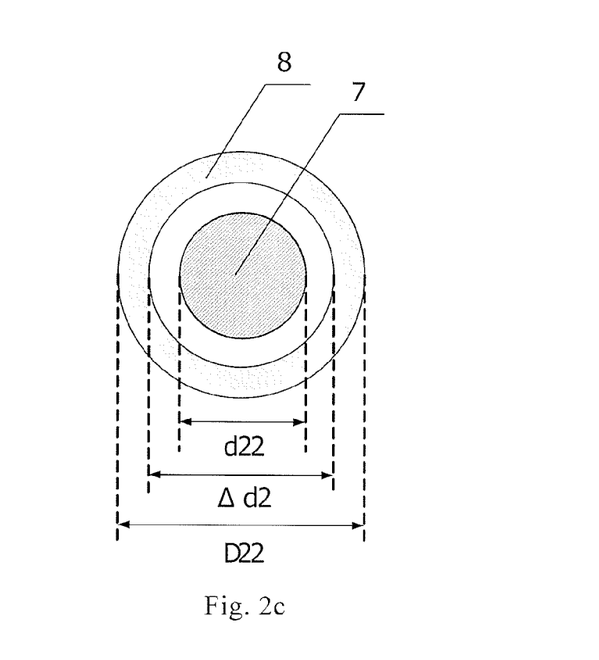
FIG. 2c is a schematic cross-sectional view of a spacer in the LCD panel according to the second embodiment of the present invention.

FIG. 2a is a schematic sectional view of a LCD panel according to the second embodiment of the present invention. As shown in FIG. 2a, the liquid crystal display (LCD) panel according to the second embodiment comprises a color filter substrate 1, a thin film transistor (TFT) array substrate 2, and a liquid crystal layer 5. At least one composite spacer is disposed between the color filter substrate 1 and the thin film transistor array substrate 2. Each spacer can comprise an inner first sub-spacer 7 and an outer first sub-spacer 8. Elasticity of the first sub-spacer 7 is smaller than elasticity of the second sub-spacer 8. The liquid crystal layer 5 is filled within the space defined by the color filter substrate 1, the thin film transistor array substrate 2 and a sealant 4. The composite spacer is located on a black matrix 3 on the color filter substrate 1. FIG. 2b is a schematic sectional view of a spacer in the LCD panel according to the second embodiment of the present invention, and FIG. 2c is a schematic cross-sectional view of a spacer in the LCD panel according to the second embodiment of the present invention. As shown in FIGS. 2b and 2c, the first sub-spacer 7 can be formed in a shape of a truncated cone with a diameter d21 of a top face, a diameter d22 of a bottom face, and a height of H2. Preferably, d21 is in a range of 6-8 µm, d22 is in a range of 12-16 µm, and H2 is in a range of 3-5 µm. There is a gap between the first sub-spacer 7 and the second sub-spacer 8. The second sub-spacer 8 can be formed in a shape of a hollow truncated cone with an outer diameter D21 of a top face, an outer diameter D22 of a bottom face, and a height of H2+Δh. Preferably, D21 is in a range of 12-14 µm, D22 is in a range of 24-28 µm, and Δh is in a range of 0.5-3 µm. The manufacturing method of the LCD panel according to the second embodiment of the present invention is described as following.

The black matrix 3 and color filter layers of red, green and blue are formed on a glass substrate to prepare the color filter substrate 1. Then the composite spacer is formed on the black matrix 3. In particular, a material with a smaller elasticity and a higher stiffness such as silicon oxide, silicon nitride and silicon oxynitride is deposited, followed by processes such as applying a photoresist, exposing with a mask, developing, etching, and lifting off, etc., so that the first sub-spacer 7 is fabricated. Then an intermediate layer is formed at the periphery of the first sub-spacer 7 using a photoreist resin or ITO by a photolithography process. The outer diameter of the top face of the intermediate layer is Δd1, the outer diameter of the bottom face of the intermediate layer is Δd2, and the height of the intermediate layer is H2. Preferably, Δd1 is in a range of 8-10 μm, and Δd2 is in a range of 16-20 μm. A material with a larger elasticity such as a photoresist resin is deposited at the periphery of the intermediate layer, followed by exposing with a mask, developing, etching processes and so on, so that the second sub-spacer 8 is fabricated. Then the intermediate layer is removed by a lifting off or etching process. Thus, a composite spacer comprising an inner rigid core and an outer elastic shell with a gap therebetween can be obtained. Finally, the color filter substrate 1 and the TFT array substrate 2 are subjected to an ODF process and assembled by the sealant 4 to obtain the LCD panel, as shown in FIG. 2a. In the present embodiment, the elastic second sub-spacer 8 can also be directly fabricated with a gap from the periphery of the rigid first sub-spacer without the intermediate layer. The composite spacer according to the present embodiment exhibits a better elasticity compared with the first embodiment due to the gap between the inner and outer sub-spacers.

Third Embodiment

Figure 3A:
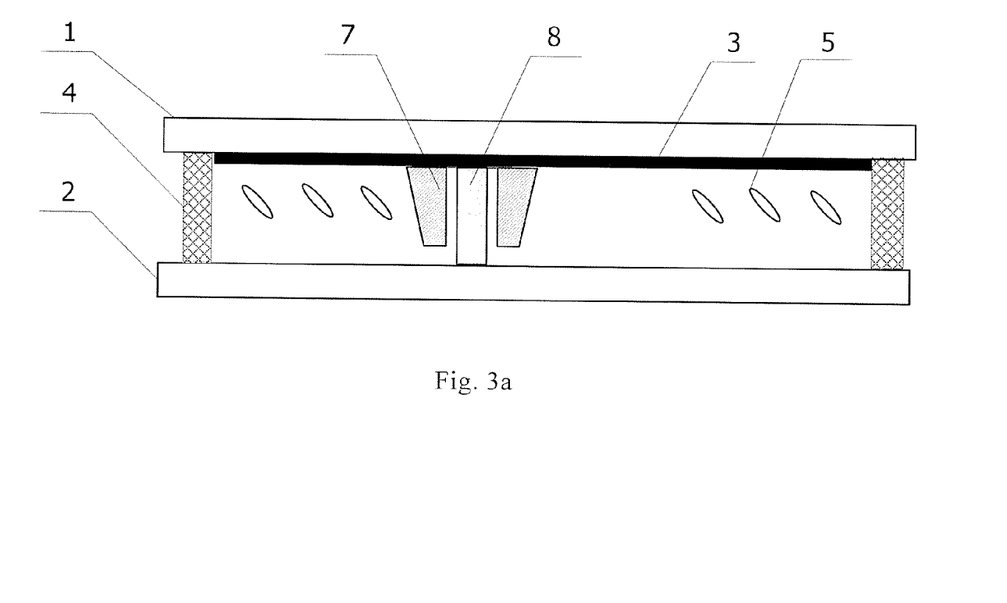
FIG. 3a is a schematic sectional view of a LCD panel according to a third embodiment of the present invention.
Figure 3B:
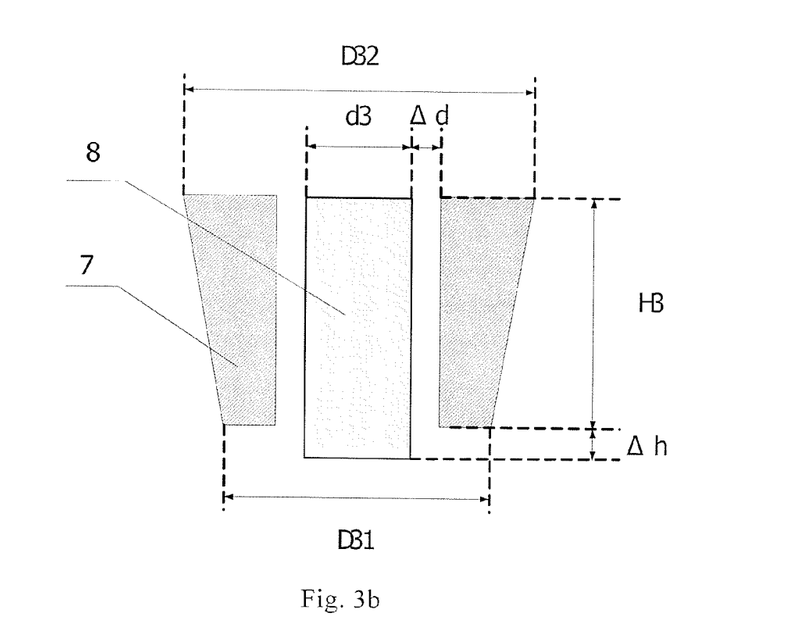
FIG. 3b is a schematic sectional view of a spacer in the LCD panel according to the third embodiment of the present invention.
Figure 3C:
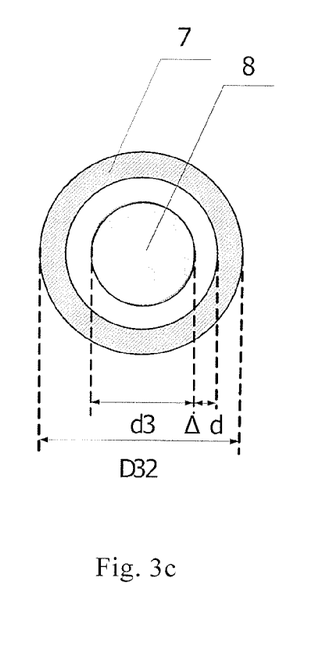
FIG. 3c is a schematic cross-sectional view of a spacer in the LCD panel according to the third embodiment of the present invention.

FIG. 3a is a schematic sectional view of a LCD panel according to the third embodiment of the present invention. As shown in FIG. 3a, the liquid crystal display (LCD) panel according to the third embodiment comprises a color filter substrate 1, a thin film transistor (TFT) array substrate 2 and a liquid crystal layer 5. At least one composite spacer is disposed between the color filter substrate 1 and the thin film transistor array substrate 2. Each spacer can comprise an outer first sub-spacer 7 and an inner first sub-spacer 8. Elasticity of the first sub-spacer 7 is smaller than elasticity of the second sub-spacer 8. The liquid crystal layer 5 is filled within the space defined by the color filter substrate 1, the thin film transistor array substrate 2 and a sealant 4. The composite spacer is located on a black matrix 3 on the color filter substrate 1. FIG. 3b is a schematic sectional view of a spacer in the LCD panel according to the third embodiment of the present invention, and FIG. 3c is a schematic cross-sectional view of a spacer in the LCD panel according to the third embodiment of the present invention. As shown in FIGS. 3b and 3c, the second sub-spacer 8 is formed in a cylinder shape with a diameter d3 of and a height of H3+Δh. Preferably, d3 is in a range of 6-8 μm, H3 is in a range of 3-5 μm, and Δh is in a range of 0.5-3 μm. There is a gap between the first sub-spacer 7 and the second sub-spacer 8. The second sub-spacer 8 can be formed in a shape of a hollow truncated cone with an outer diameter D31 of a top face and an outer diameter D32 of a bottom face, and a height of H3. Preferably, D31 is in a range of 10-12 μm, and D32 is in a range of 25-30 μm. The manufacturing method of the LCD panel according to the third embodiment of the present invention is substantially the same as the second embodiment except that the inner core of the spacer is elastic and the outer shell of the spacer is rigid. Therefore, the details of the manufacturing method are not repeated here.

Figure 4A:
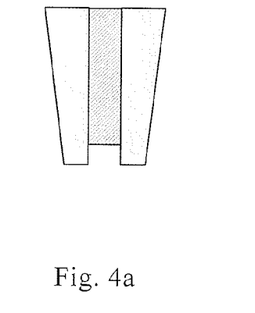
FIG. 4a-4f are schematic sectional views of the spacers in the LCD panel according to the present invention.
Figure 4B:
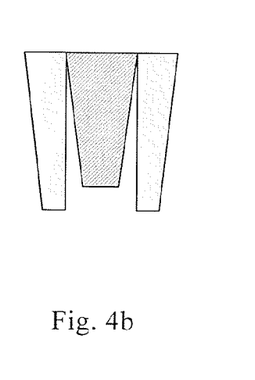
Figure 4C:
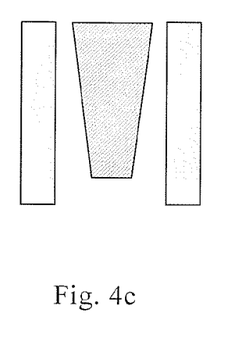
Figure 4D:
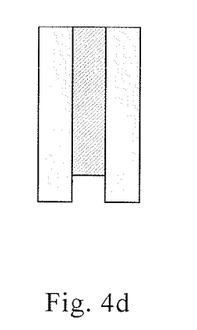
Figure 4E:
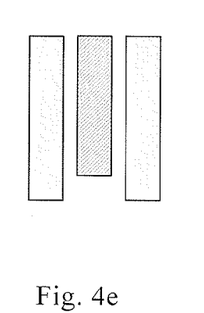
Figure 4F:
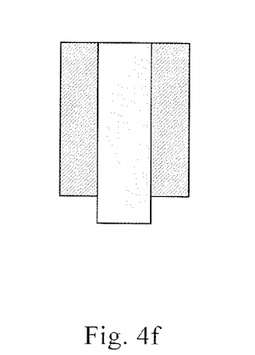
Figure 4G:
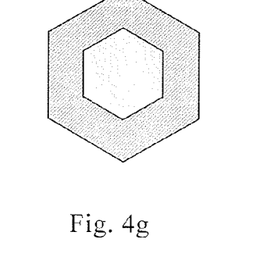
FIG. 4g is a schematic cross-sectional view of a spacer in FIG. 4f.

Other shapes of the spacer are also possible. For example, as shown in FIGS. 4a-4e, the rigid core of the spacer can be formed in a shape of cylinder or truncated cone, and the elastic shell can be formed in a shape of hollow cylinder or a hollow truncated cone. The rigid core can directly contact with the elastic shell, and alternatively, the rigid core can be spaced from the elastic shell with a variant or constant gap. As shown in FIGS. 4f and 4g, the elastic core of the spacer can be formed in a shape of prism or frustum, and rigid shell of the spacer can be formed in a shape of hollow prism or frustum. As shown in FIG. 4g, the cross-section shape of the bottom face of the spacer can be a polygonal such as a hexagonal.

Alternatively, the composite spacer can comprise more than two sub-spacers. Each sub-spacer is different in height. The higher sub-spacer has a larger elasticity, that is, the higher sub-spacer is, the larger the elasticity of the sub-spacer is.

Figure 5:
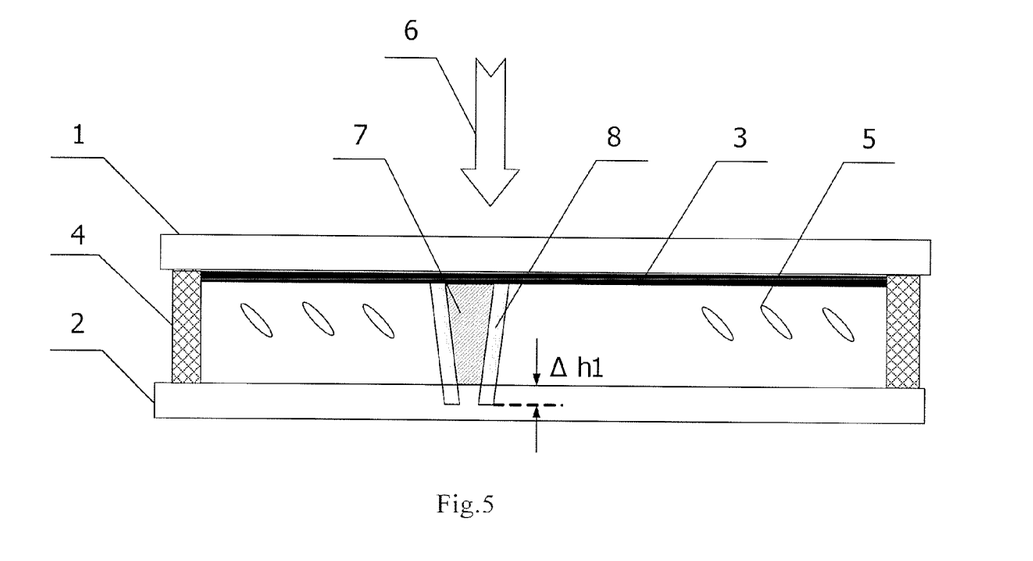
FIG. 5 is a schematic view of the spacer when the LCD panel according to the present the invention is under an external pressure.

FIG. 5 is a schematic view showing the deformation of the spacer when the LCD panel according to the present the invention is under an external pressure. When the LCD panel is subjected to an external pressure or the gravity force 6, the elastic shell portion 8 is deformed. When the shrinkage of the elastic shell portion reaches Δh, the rigid core portion 7 contacts with the TFT array substrate 2 to provide more support against pressure or gravity. Therefore, the composite spacer can provide a great support for the LCD panel and have a better pressure resistance to avoid gravity defects or pressure defects. Since the pressure resistance of the spacers is improved, the distribution density of the spacers can also be reduced so as to improve the margin of amount of the filled liquid crystal in an ODF process.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display (LCD) panel, comprising:
a color filter substrate;
a thin film transistor (TFT) array substrate;
a liquid crystal layer disposed between the color filter substrate and the thin film transistor array substrate; and
at least one spacer disposed between the color filter substrate and the thin film transistor array substrate, wherein the spacer comprises a first sub-spacer and a second sub-spacer, elasticity of the first sub-spacer is smaller than elasticity of the second sub-spacer, and height of the first sub-spacer is smaller than height of the second sub-spacer.

2. The LCD panel according to claim 1, wherein the second sub-spacer is located outside of the first sub-spacer.

3. The LCD panel according to claim 2, wherein the first sub-spacer directly contacts with the second sub-spacer.

4. The LCD panel according to claim 2, wherein a gap is formed between the first sub-spacer and the second sub-spacer.

5. The LCD panel according to claim 4, wherein the gap between the first sub-spacer and the second sub-spacer is in a range of 0 to 15 μm.

6. The LCD panel according to claim 2, wherein the first sub-spacer has a shape selected from a group consisting of a cylinder, a prism and a frustum, and the second sub-spacer has a shape selected from a group consisting of a hollow cylinder, a hollow prism and a hollow frustum.

7. The LCD panel according to claim 1, wherein the second sub-spacer is located inside of the first sub-spacer.

8. The LCD panel according to claim 7, wherein the first sub-spacer directly contacts with the second sub-spacer.

9. The LCD panel according to claim 7, wherein and a gap is disposed between the first sub-spacer and the second sub-spacer.

10. The LCD panel according to claim 9, wherein the gap between the first sub-spacer and the second sub-spacer is in a range of 0 to 15 μm.

11. The LCD panel according to claim 7, wherein the second sub-spacer has a shape selected from a group consisting of a cylinder, a prism and a frustum, and the first sub-spacer has a shape selected from a group consisting of a hollow cylinder, a hollow prism and a hollow frustum.

12. The LCD panel according to claim 1, wherein the first sub-spacer comprises a material selected from a group consisting of silicon oxide, silicon nitride and silicon oxynitride.

13. The LCD panel according to claim 1, wherein the second sub-spacer comprises a photoresist resin.

14. The LCD panel according to claim 1, wherein the height of the second sub-spacer is in a range of 1-10 μm, and height difference between the first sub-spacer and the second sub-spacer is no more than 5 μm.

15. The LCD panel according to claim 14, wherein the gap between the first sub-spacer and the second sub-spacer is in a range of 0 to 15 μm.

16. A spacer for a liquid crystal display panel, comprising at least two sub-spacers, wherein each sub-spacer is different in height, and the higher sub-spacer is, the larger the elasticity of the sub-spacer is.

* * * * *